(12) United States Patent
Abouelmakarem

(10) Patent No.: US 9,717,232 B1
(45) Date of Patent: Aug. 1, 2017

(54) ELECTRICALLY CONTROLLED MOVABLE TREE STAND FOR SUPPORTING A PERSON

(71) Applicant: Kadry Abouelmakarem, Wappingers Falls, NY (US)

(72) Inventor: Kadry Abouelmakarem, Wappingers Falls, NY (US)

(*) Notice: Subject to any disclaimer, the term of this patent is extended or adjusted under 35 U.S.C. 154(b) by 0 days.

(21) Appl. No.: 15/244,215

(22) Filed: Aug. 23, 2016

(51) Int. Cl.
*E04C 1/00* (2006.01)
*A01M 31/02* (2006.01)

(52) U.S. Cl.
CPC .................................. *A01M 31/02* (2013.01)

(58) Field of Classification Search
CPC .................................................... A01M 31/02
USPC .............. 182/103, 141, 116, 63.1, 69.9, 69.6
See application file for complete search history.

(56) References Cited

U.S. PATENT DOCUMENTS

| | | | | |
|---|---|---|---|---|
| 5,312,218 A * | 5/1994 | Pratt | ....................... | B66C 1/105 187/900 |
| 5,595,265 A * | 1/1997 | Lebrocquy | ............ | A01M 31/02 187/244 |
| 5,927,440 A * | 7/1999 | Freeman | ................... | B66B 9/16 182/141 |
| 7,942,244 B2 * | 5/2011 | Lombard | ................ | B66B 9/187 182/141 |
| 8,505,688 B2 * | 8/2013 | Campbell | ............... | B66F 11/04 182/141 |
| 8,708,104 B1 * | 4/2014 | Sponsler | ............... | A01M 31/02 182/133 |
| D704,914 S * | 5/2014 | Campbell | ....................... | D34/28 |
| 2011/0297481 A1 * | 12/2011 | Copus | .................... | A01M 31/02 182/113 |
| 2011/0308887 A1 * | 12/2011 | Johnson | ................ | A01M 31/02 182/187 |
| 2014/0202796 A1 * | 7/2014 | Sponsler | ............... | A01M 31/02 182/188 |

* cited by examiner

*Primary Examiner* — Jerry Redman
(74) *Attorney, Agent, or Firm* — Leason Ellis LLP

(57) ABSTRACT

A motorized tree stand includes a frame assembly for attachment to a tree. The frame assembly includes a rear wall that includes a vertical drive track and at least one vertical gliding rail spaced laterally therefrom. A seat assembly is operatively coupled to the rear wall of the frame assembly and provides a seat on which a user can sit. A first drive assembly is coupled to the seat assembly and includes a first motor that is connected to a driven wheel that seats against the vertical drive track to controllably move the seat assembly in a vertical direction along the frame assembly. A second drive assembly is coupled to a swivel plate for controllably moving the swivel plate resulting in swiveling of the seat assembly relative to the frame assembly. A controller and a power source are also provided.

19 Claims, 16 Drawing Sheets

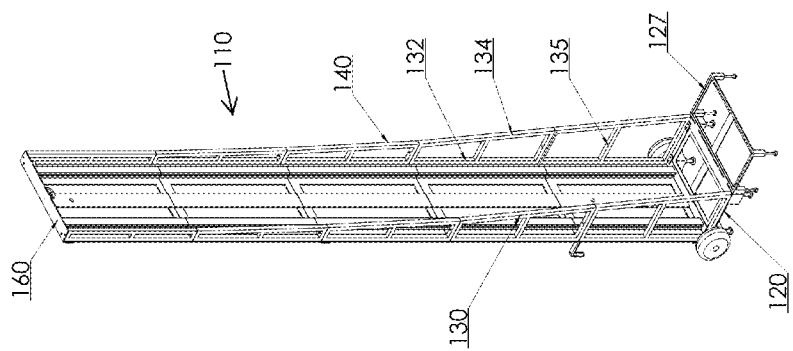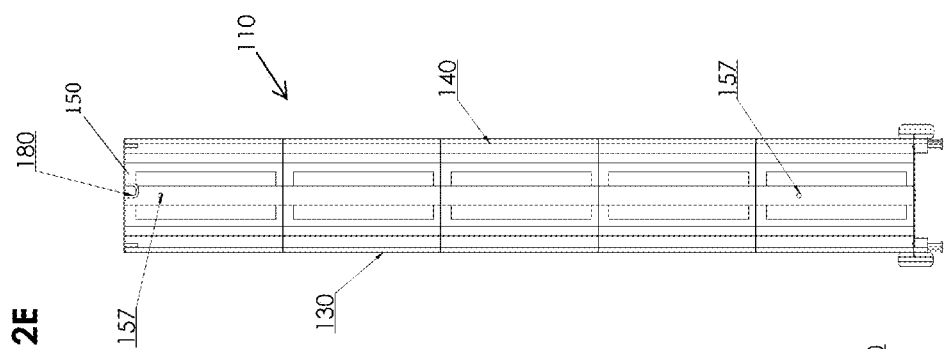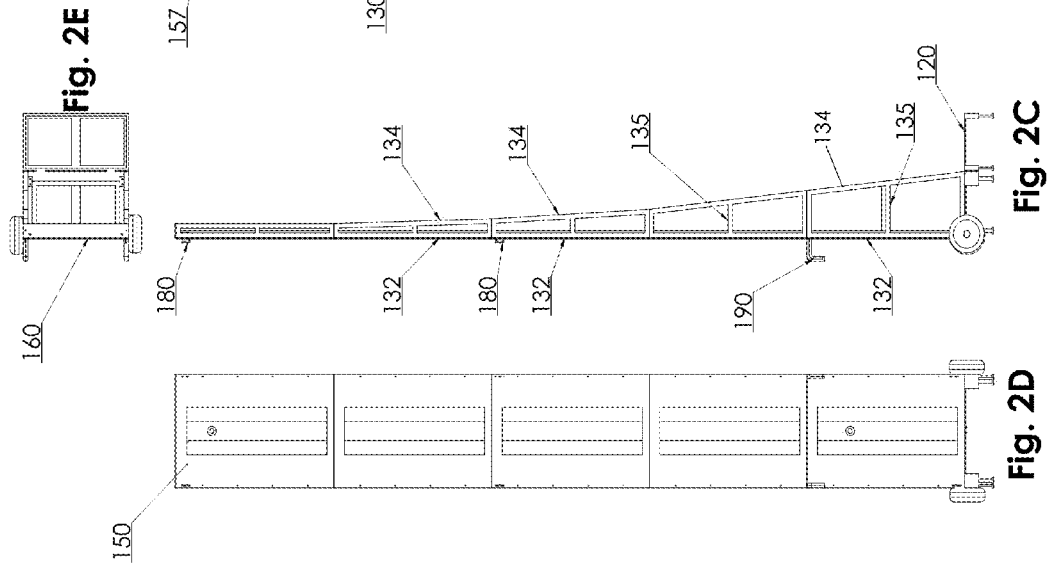

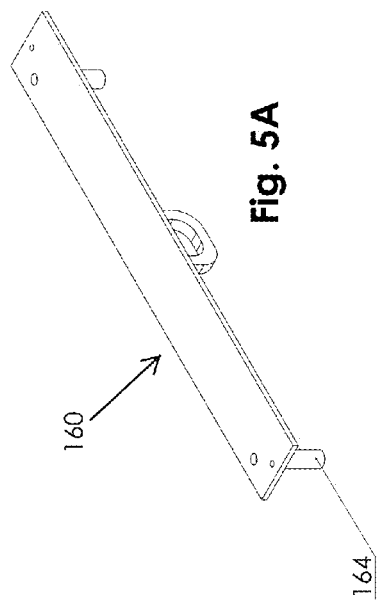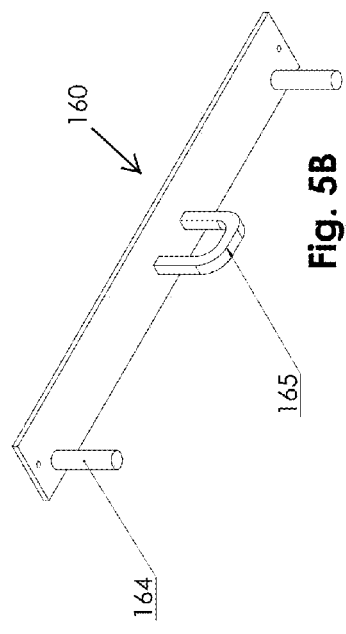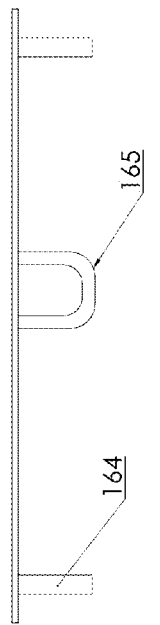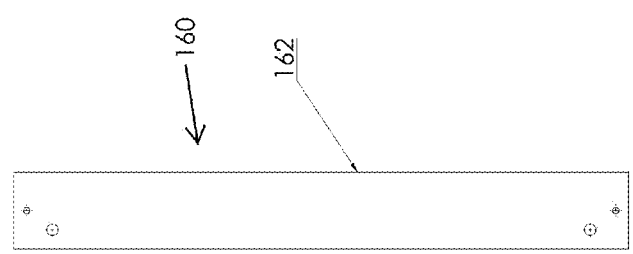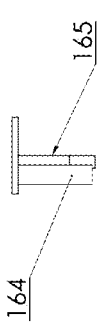

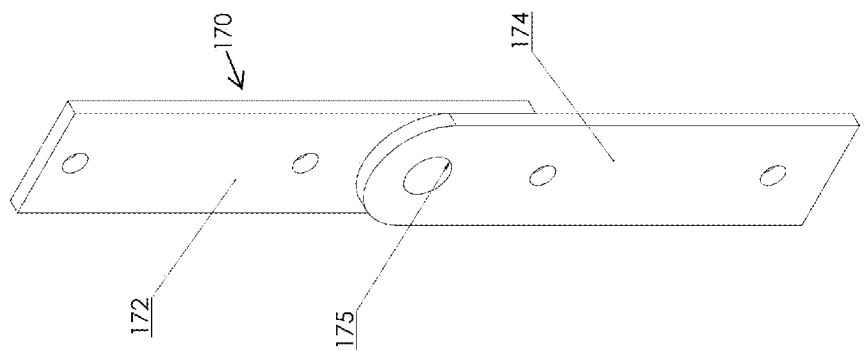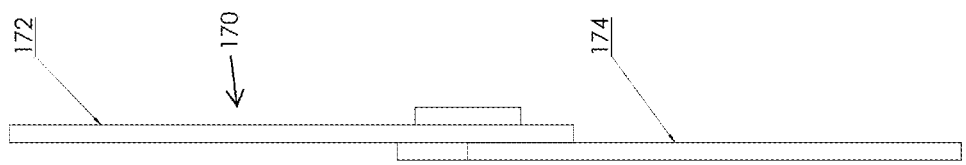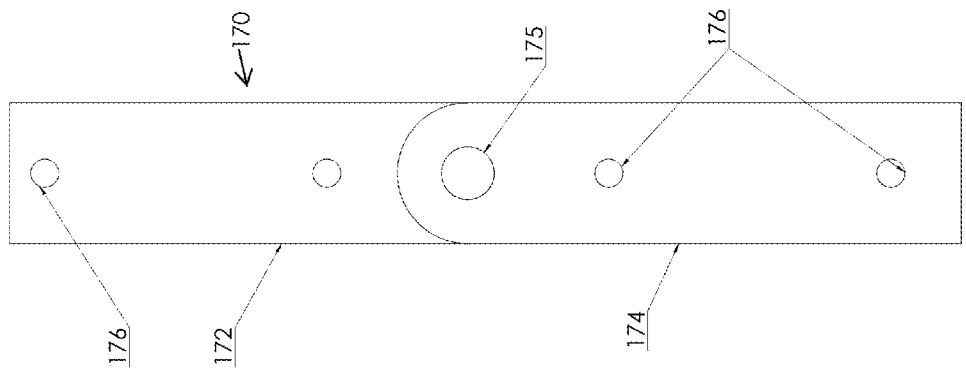

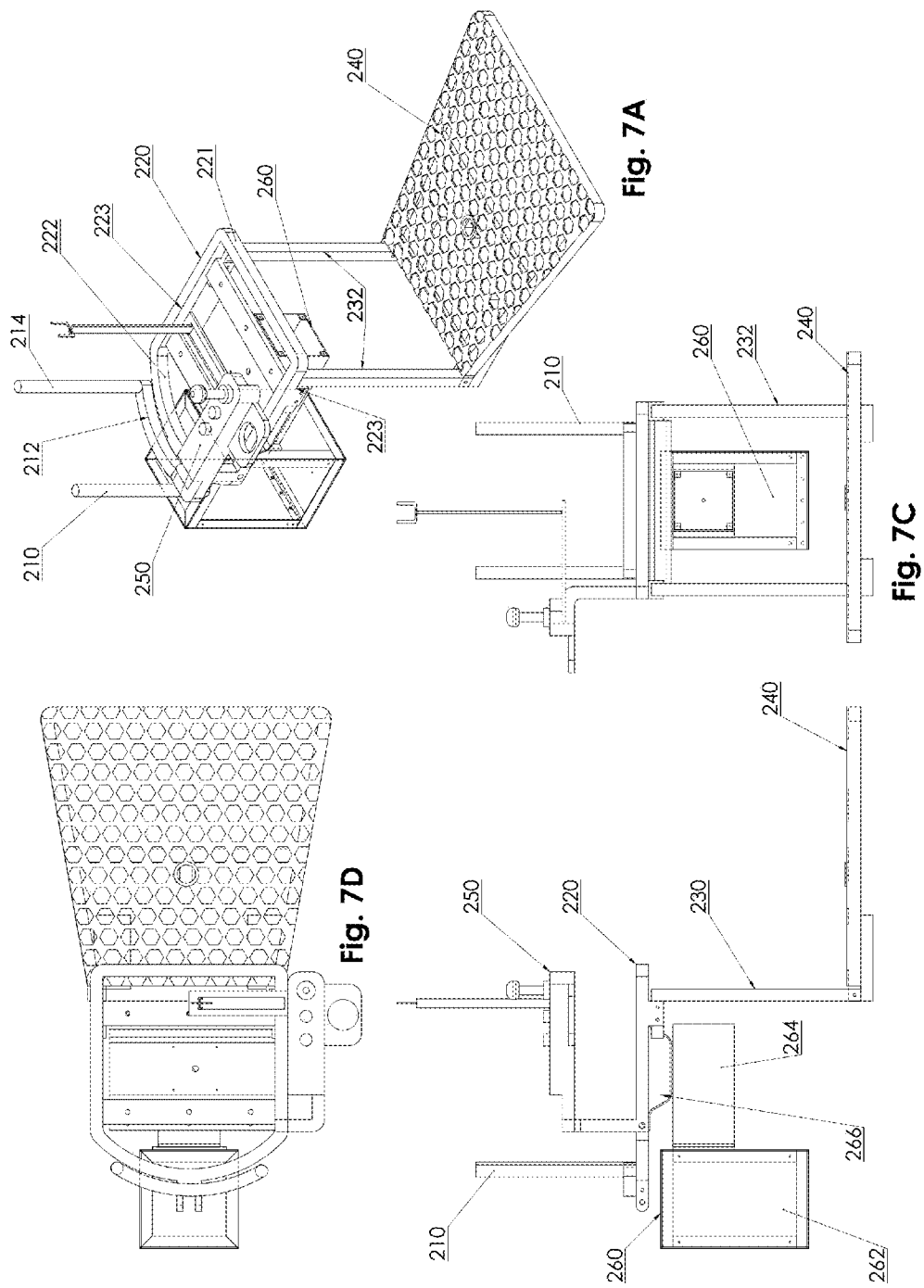

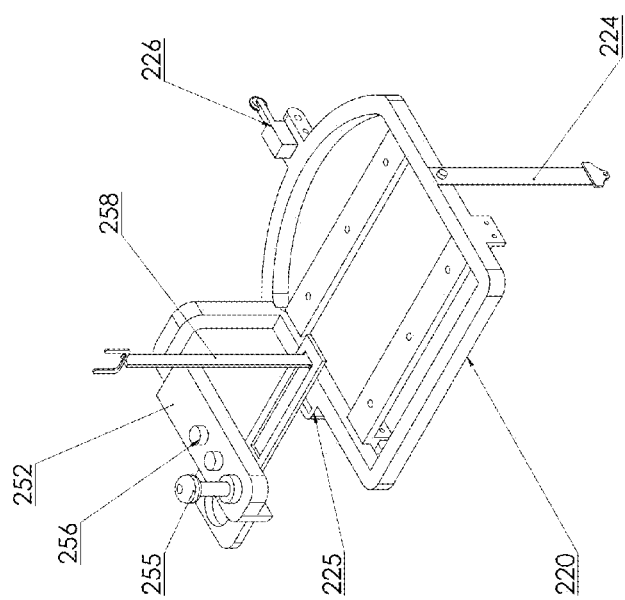
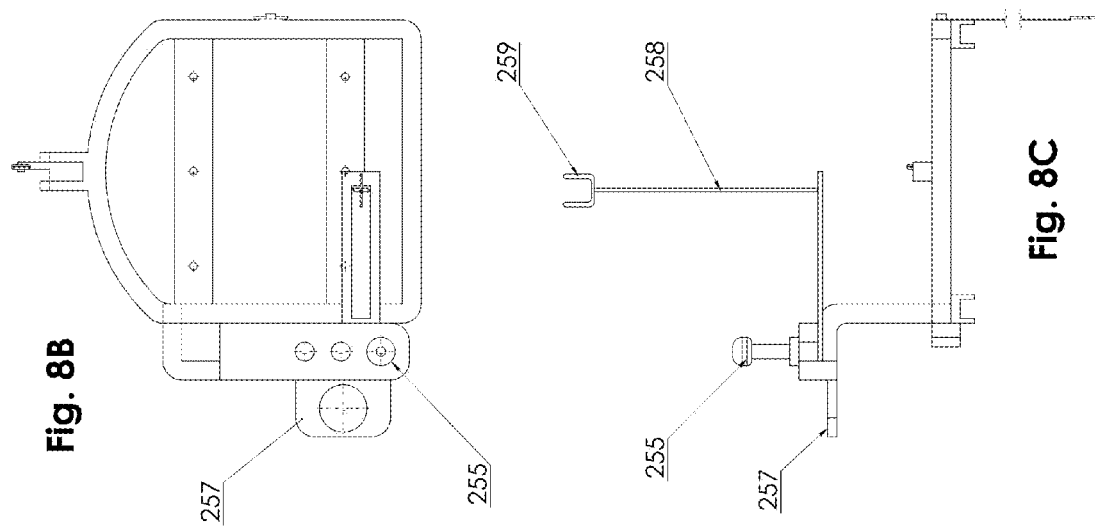

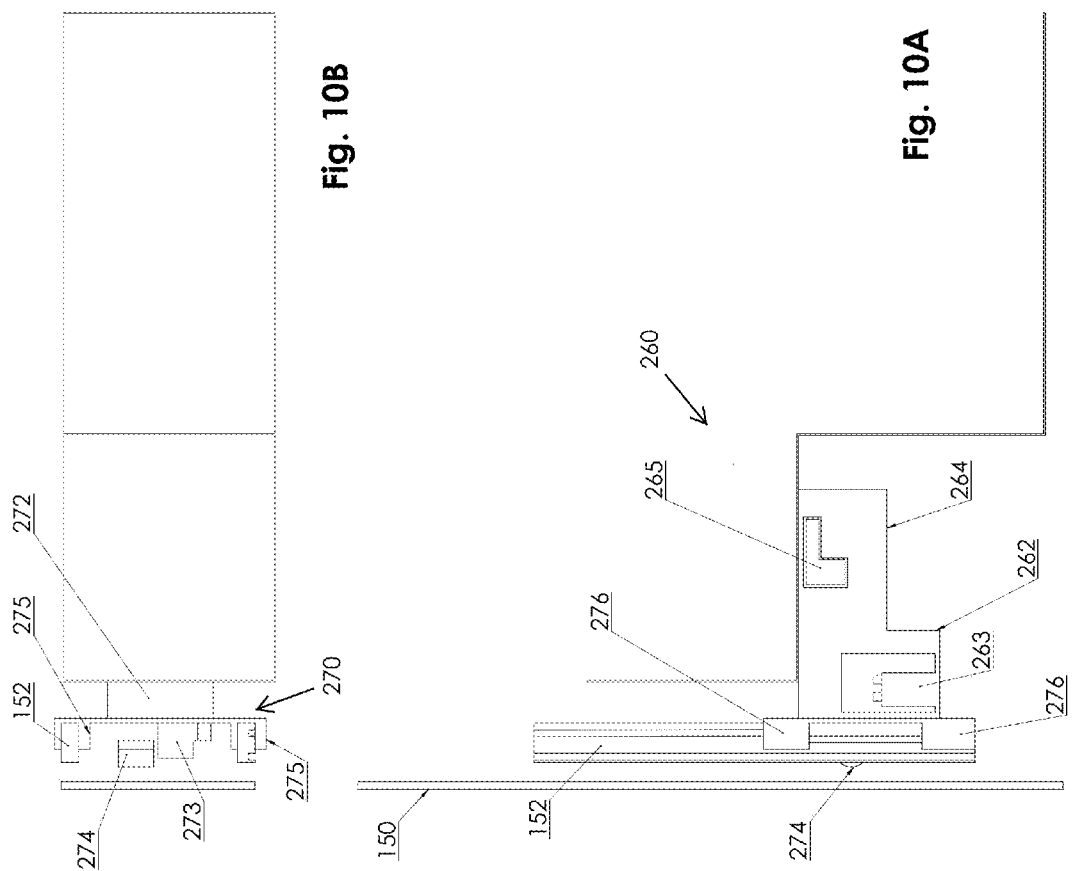

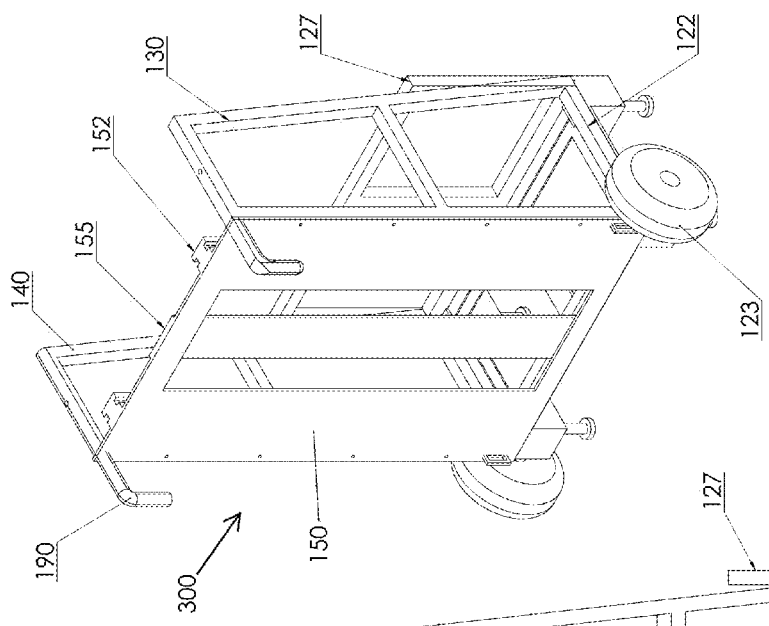
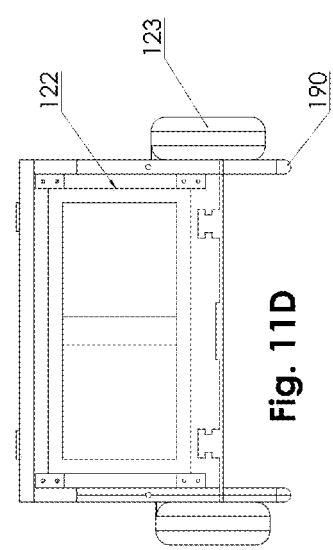
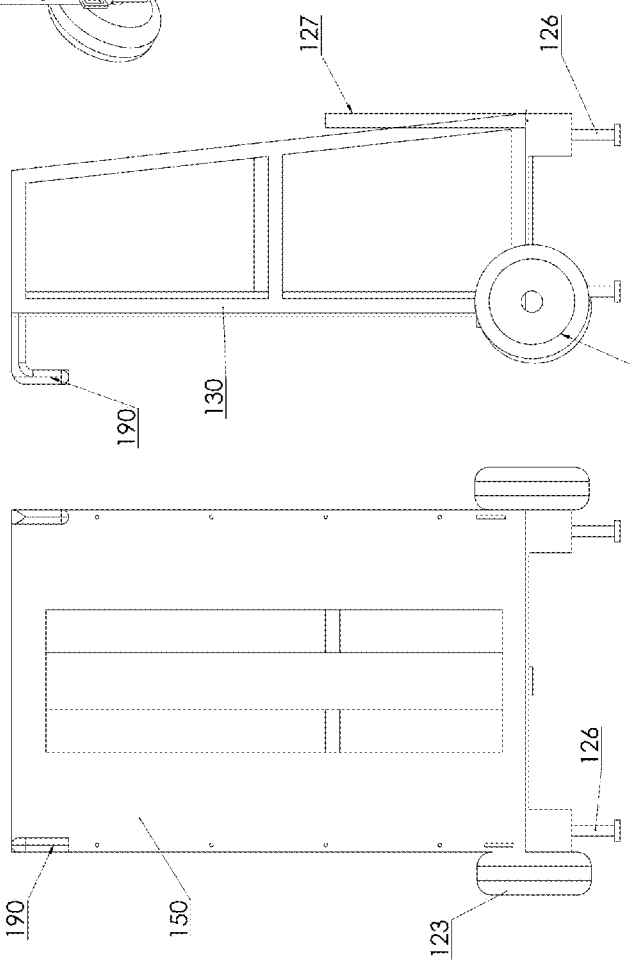

US 9,717,232 B1

ELECTRICALLY CONTROLLED MOVABLE TREE STAND FOR SUPPORTING A PERSON

TECHNICAL FIELD

The present invention relates to a stand for supporting a person and more particularly, relates to a stand that is configured to mount to a tree and move (e.g., up/down and left/right movements) so as to be particularly useful as a tree stand for a hunter.

BACKGROUND

All conventional tree stands in today's market are fixed and limited to certain people with good physical ability to climb up the stand. They require climbing if they are the ladder built in type, or require climbing on a ladder to be installed if they are just tree stands. This becomes limited to a specific group of people with good physical ability to climb up or down the ladder.

Have you ever sat in your stand, waiting all day for your harvest to come by and when it shows up, it approaches you from the wrong direction and you miss your opportunity? Meaning, you are right sighted, right handed and the wild game appears to your right side and about to disappear on you. You try to position yourself and taking risk of falling, getting badly hurt or injure the wild game in which will die in suffering.

Conventional tree stands are fixed in position and require climbing up and down to access the stand and they do not rotate or swing to permit desired movement of the hunter relative to the wild game.

In case of an accidental fall, conventional tree stand do not offer a safe way of climbing down. Suspension while strapped to your safety harness can cut the blood circulation and you should not be suspended more than 15 minutes. In this situation, you are at the mercy of being found by someone to save you. There is therefore a need for an improved tree stand.

SUMMARY

The stand of the present invention solves the above-discussed deficiencies associated with conventional tree stands and can be configured to:
1—enable all hunters, even with some physical disability to safely climb up and enjoy the use a tree stand;
2—offer the hunter the freedom to rotate from 0-180 degrees instead of a fixed position;
3—offer the hunter a safe way to get down in case of a fall by using the side support as a ladder. So he/she doesn't get stranded in the middle of the forest waiting for someone to rescue them; and
4—Include controllers, such as joystick or a digital touch screen controller, where you can operate the system with just a push of a button.

Have you ever gone hunting and sat in your fixed tree stand almost all day waiting for a wild game to show up? All the sudden one shows up but from an opposite direction from your dominate sight or dominate hand. Your heart is beating so fast from excitement; you try to position yourself to have your target in sight, it's not working but you are not going to let go. You tried very hard and perhaps even compromised your own safety not to lose this wild game. You know what may have happened. You either lose track of your position or may end up getting severely hurt, paralyzed or even death, because you didn't take in consideration the recoil of your firearm. Or you may injure the wild game which will end up with painful death. Neither outcome is a good.

Since all tree stands have a fixed position, meaning, once you set it up, it's only one direction you are facing. In many cases, the wild game shows up from an opposite direction and you miss it.

What if the hunter is an injured veteran or someone with physical limitation to where that he or she can't climb a ladder? The motorized system of the present invention enables a user to be lifted up and down safely with a push of a button and enjoy hunting like everyone else.

The present invention is designed to allow the hunter to use a tree stand and give them the ability to swing and rotate to select the desired position/direction facing the target without missing the opportunity, injuring the wild animal or compromising their own safety. It also provides a safe way to get down or up in case of a slip or fall, instead of being suspended in mid-air by a harness that. The suspension in mid-air with the harness strapped, adding the weight of the person, creates high pressure that may cut the blood flow or supply to major parts of the body while waiting for someone to rescue them in the middle of the forest.

In one embodiment, a motorized tree stand includes a frame assembly for attachment to a tree. The frame assembly includes a rear wall that includes a vertical drive track and at least one vertical gliding rail spaced laterally therefrom. A seat assembly is operatively coupled to the rear wall of the frame assembly and provides a seat on which a user can sit. A first drive assembly is coupled to the seat assembly and includes a first motor that is connected to a driven wheel that seats against the vertical drive track to controllably move the seat assembly in a vertical direction along the frame assembly. A second drive assembly is coupled to a swivel plate for controllably moving the swivel plate resulting in swiveling of the seat assembly relative to the frame assembly. A controller and a power source are also provided.

BRIEF DESCRIPTION OF THE DRAWING FIGURES

FIG. 1A is a perspective view of the electrically controlled movable tree stand in accordance with a first embodiment of the present invention;
FIG. 1B is a side elevation view thereof;
FIG. 2A is a perspective view of a frame assembly of the tree stand of FIG. 1;
FIG. 2B is a front elevation view thereof;
FIG. 2C is a side elevation view thereof;
FIG. 2D is a rear elevation view thereof;
FIG. 2E is a top plan view thereof;
FIG. 3A is a perspective view of a base platform of the tree stand of FIG. 1;
FIG. 3B is a side elevation view thereof;
FIG. 3C is a top plan view thereof;
FIG. 3D is an end elevation view thereof;
FIG. 4A is a front perspective view of a back wall of the tree stand of FIG. 1;
FIG. 4B is a front elevation view thereof;
FIG. 4C is a rear elevation view thereof;
FIG. 4D is a top plan view thereof;
FIG. 5A is a top perspective view of a top plate of the tree stand of FIG. 1;
FIG. 5B is a bottom perspective view thereof;
FIG. 5C is a side elevation thereof;
FIG. 5D is a top plan view thereof;
FIG. 5E is a front elevation view thereof;

FIG. 6A is a perspective view of foldable hinges of the tree stand of FIG. 1;

FIG. 6B is a front elevation view thereof;

FIG. 6C is a side elevation view thereof;

FIG. 6D is a top plan view thereof;

FIG. 7A is a perspective view of a seat assembly of the tree stand of FIG. 1;

FIG. 7B is a side elevation view thereof;

FIG. 7C is a front elevation view thereof;

FIG. 7D is a top plan view thereof;

FIG. 8A is a perspective view of an analog control arm of the tree stand of FIG. 1;

FIG. 8B is a top plan view thereof;

FIG. 8C is a side elevation view thereof;

FIG. 10A is a side elevation view of a seat foundation of the tree stand of FIG. 1;

FIG. 10B is a top plan view thereof;

FIG. 11A is a perspective view of a folded cart of the tree stand of FIG. 1;

FIG. 11B is a side elevation view thereof;

FIG. 11C is a rear elevation view thereof;

FIG. 11D is a top plan view;

DETAILED DESCRIPTION OF CERTAIN EMBODIMENTS

As stated above, the present system solves the hunter's fixed position and enables a hunter with some physical disability to climb up and down safely and enjoy the use of a tree stand.

Figure 1B:
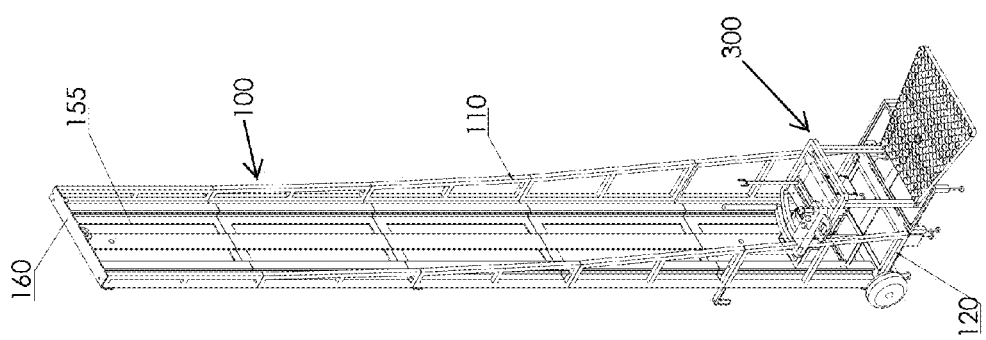
Figure 1A:
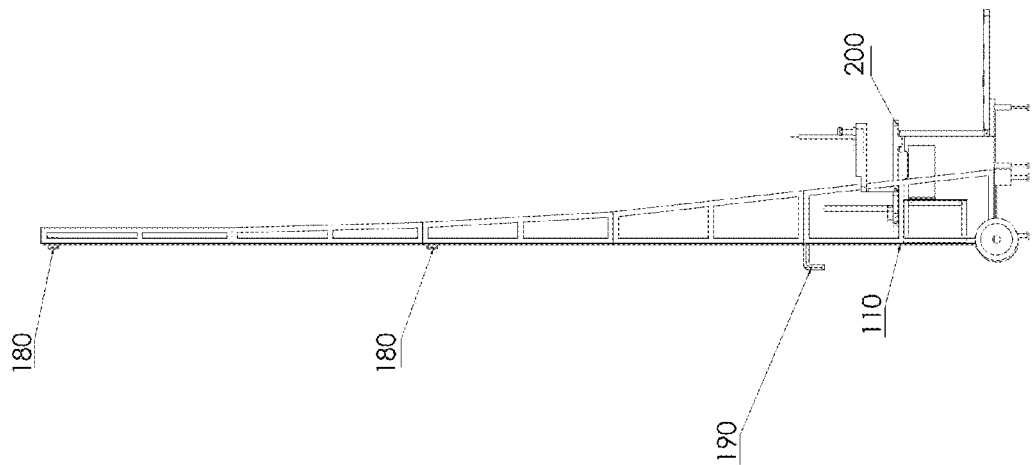
Figure 3A:
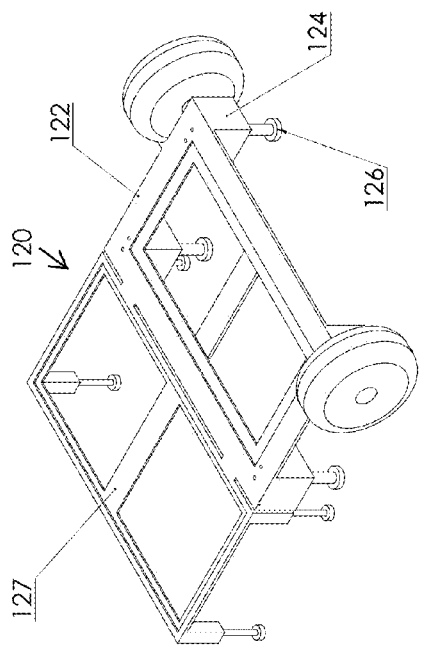
Figure 3D:
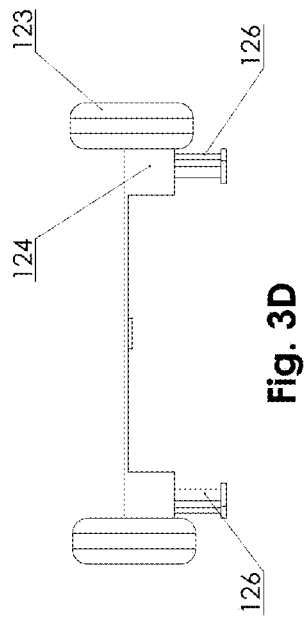
Figure 3C:
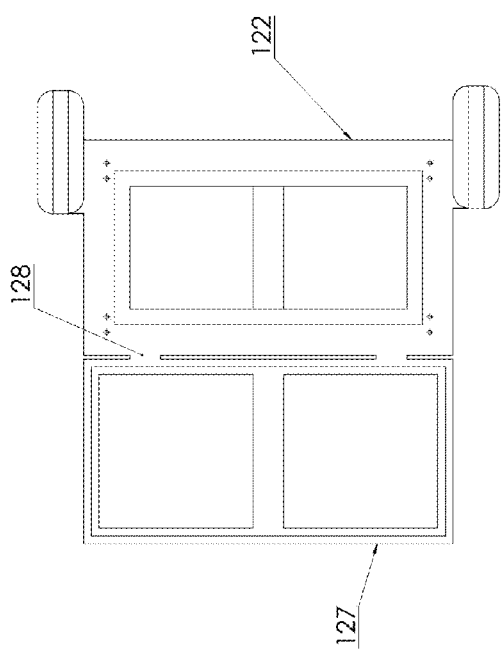
Figure 3B:
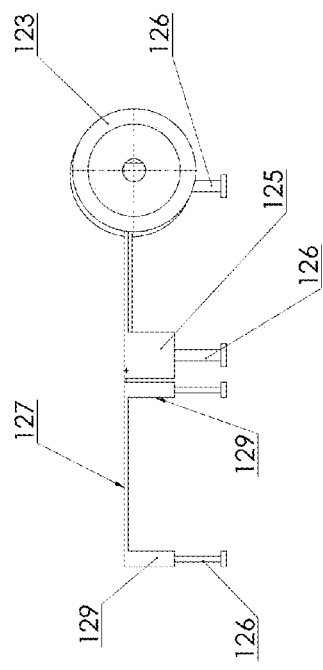
Figure 4A:
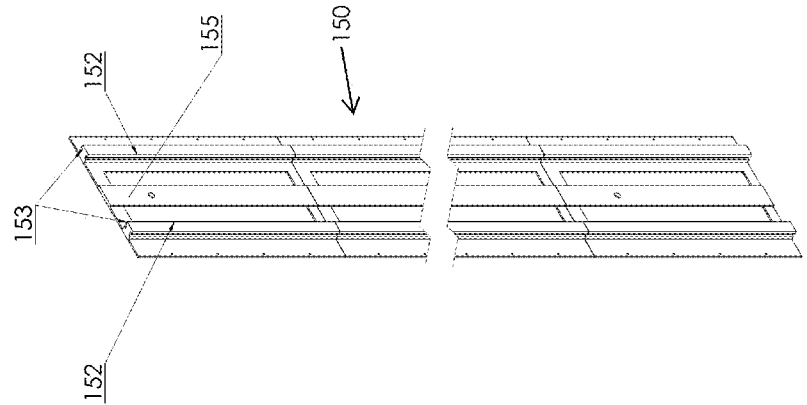
Figure 4B:
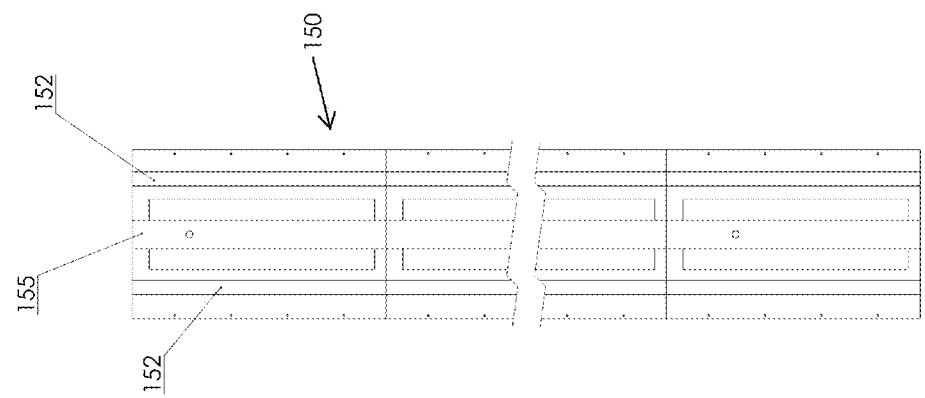
Figure 4D:
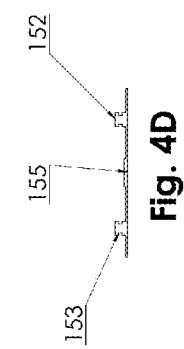
Figure 4C:
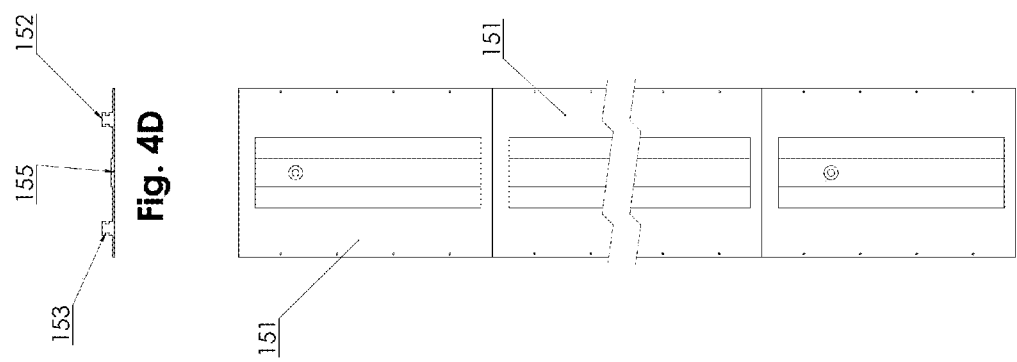
Figure 9A:
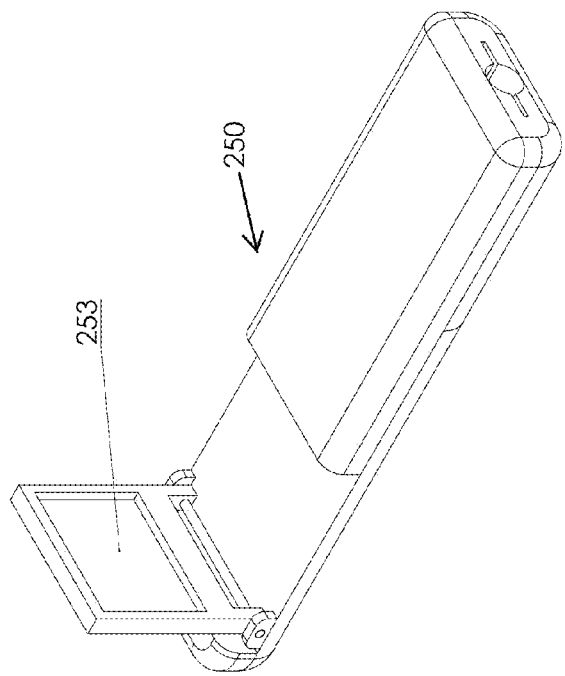
FIG. 9A is a perspective view of an arm rest controller of the tree stand of FIG. 1.
Figure 9D:
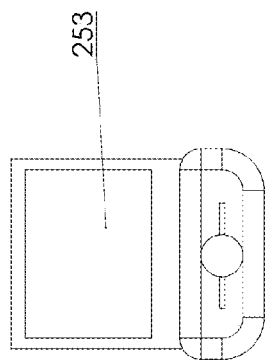
FIG. 9D is a front elevation view thereof.
Figure 9C:
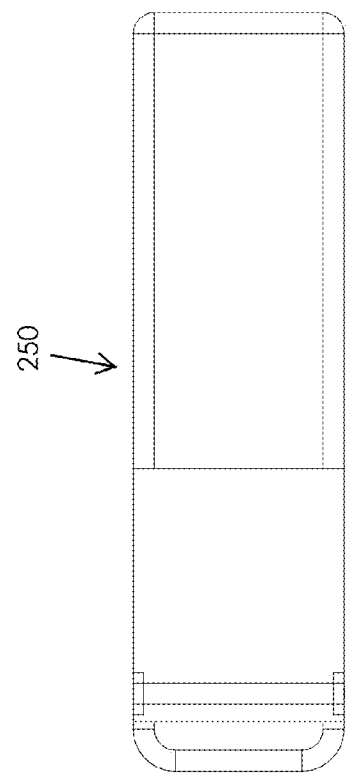
FIG. 9C is a top plan view thereof.
Figure 9B:
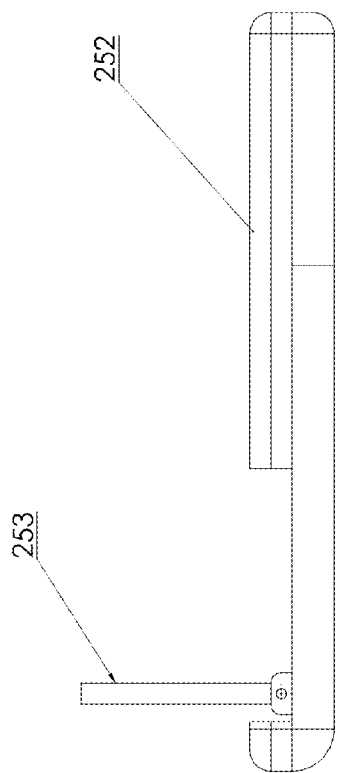
FIG. 9B is a side elevation view thereof.
Figure 12A:
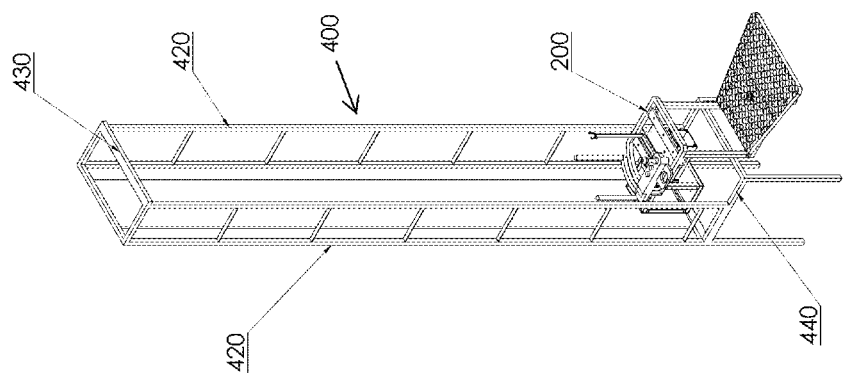
FIG. 12A is a front perspective view of a tree stand incorporating an alternative cage structure.
Figure 12B:
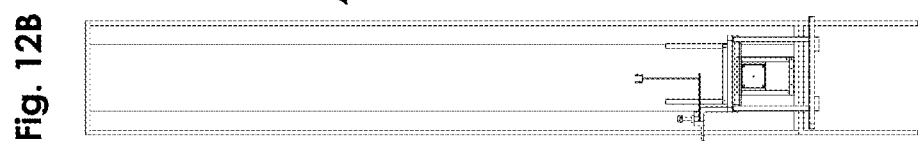
FIG. 12B is a front elevation view thereof.
Figure 12C:
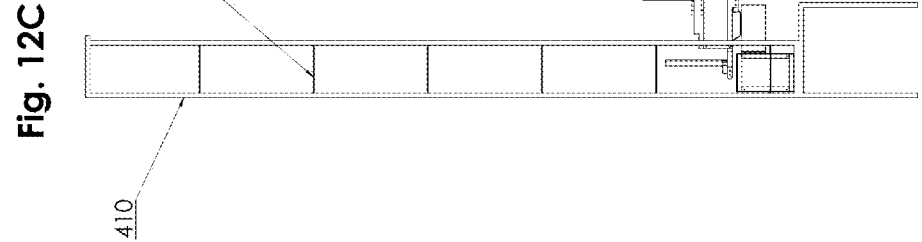
FIG. 12C is a side elevation view thereof.
Figure 12D:
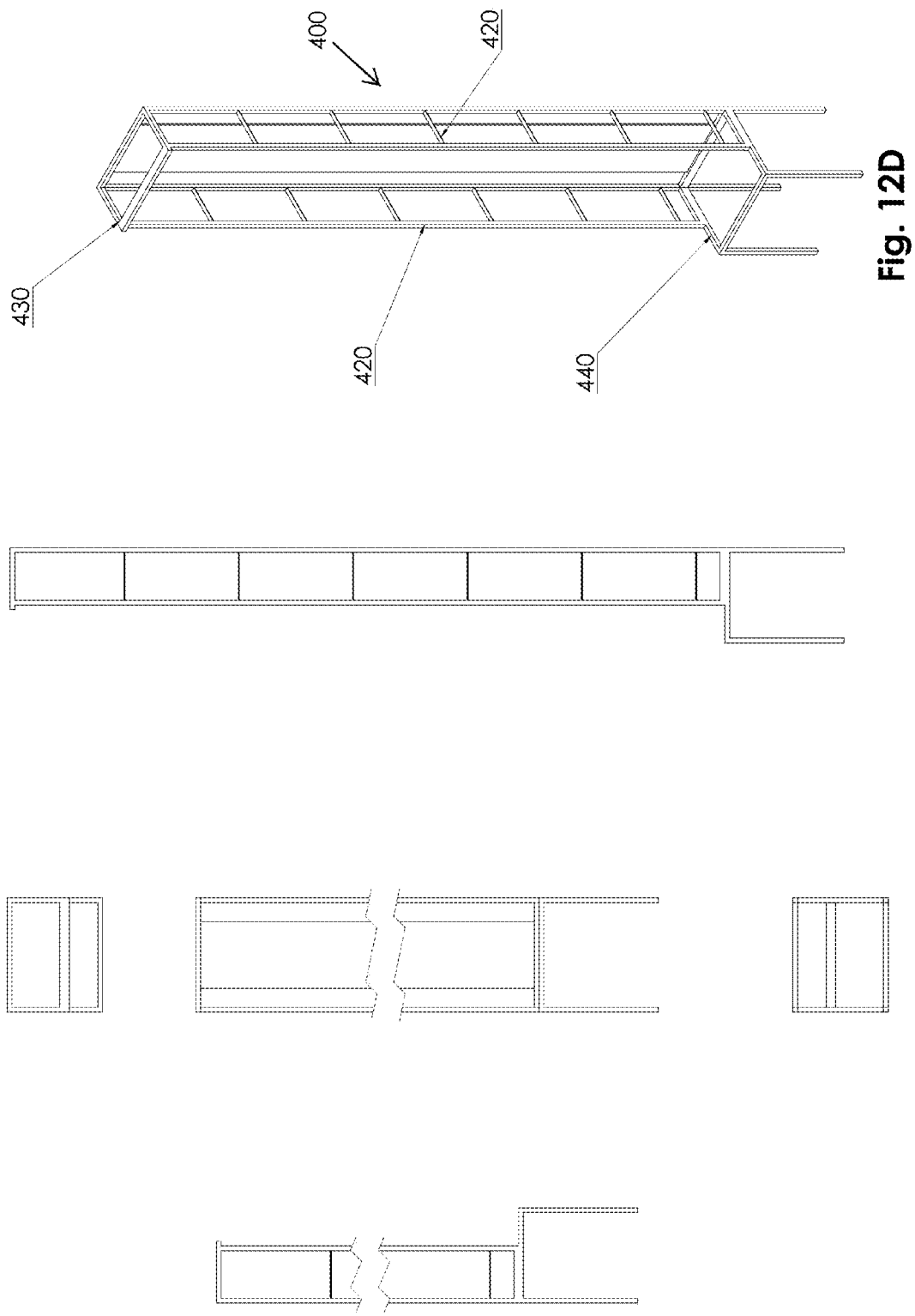
FIG. 12D is a perspective view thereof without the seat assembly.
Figure 13A:
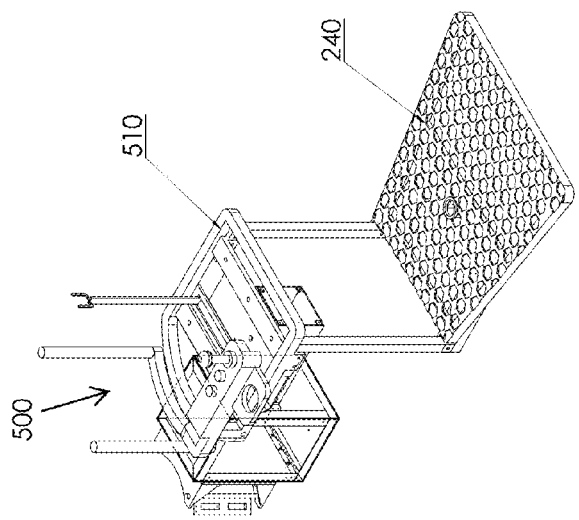
FIG. 13A is a front perspective view of an alternative rotating/swinging tree stand.
Figure 13D:
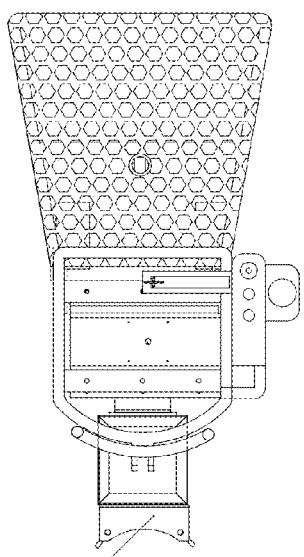
FIG. 13D is a top plan view thereof.
Figure 13C:
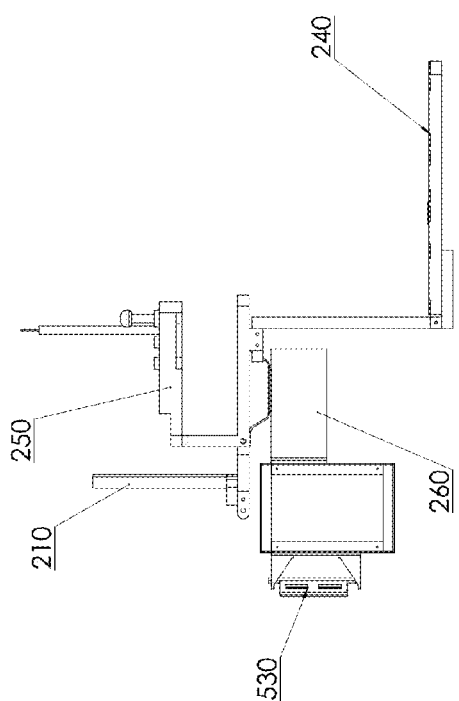
FIG. 13C is a front elevation view thereof.
Figure 13B:
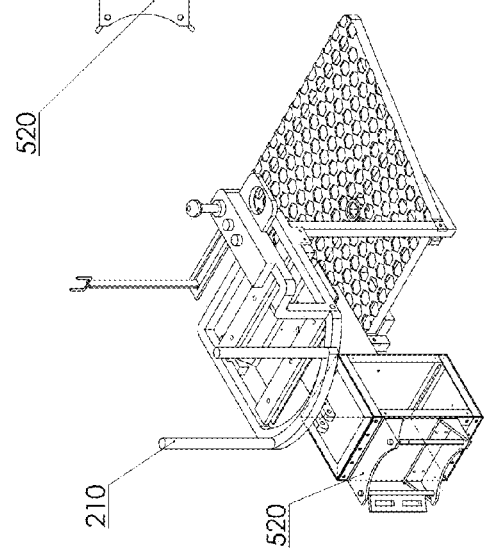
FIG. 13B is a rear perspective view thereof.
Figure 14A:
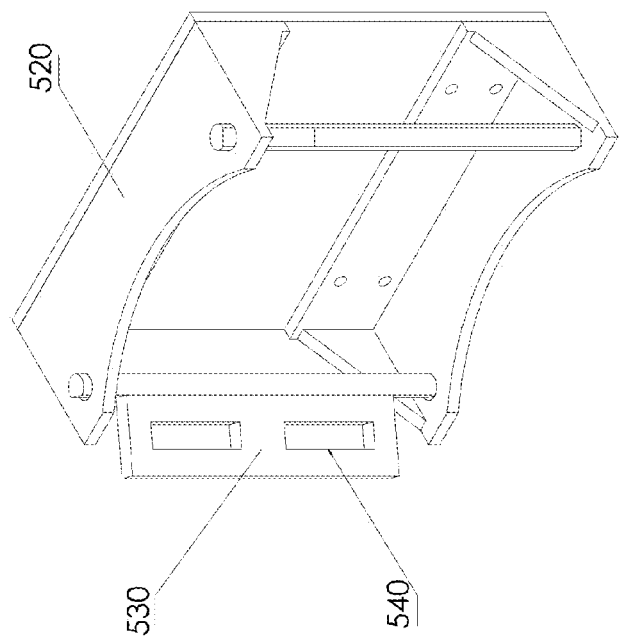
FIG. 14A is a perspective view of a seat strapping assembly of the tree stand of FIG. 13A.
Figure 14C:
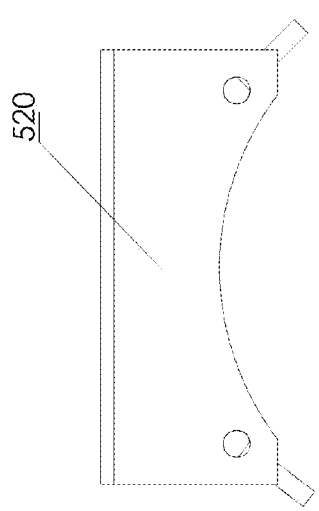
FIG. 14C is a top plan view thereof.
Figure 14B:
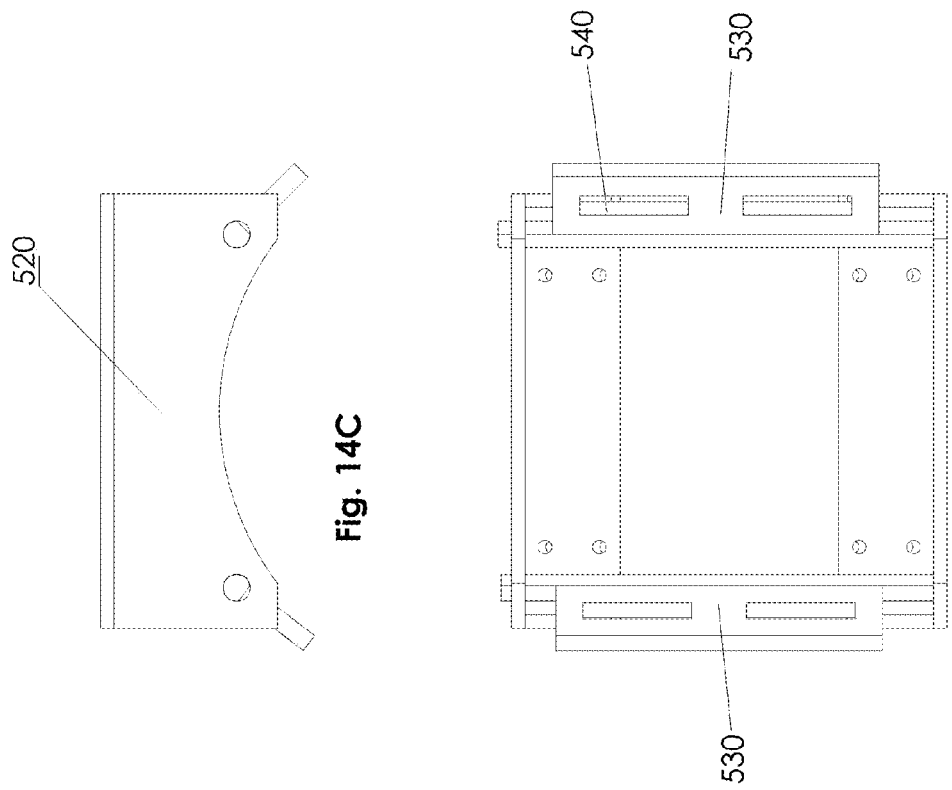
FIG. 14B is a front elevation view thereof.

FIGS. 1A and 1B illustrate an electrically controllable tree stand 100 that can be moved in one or more directions under the control of the user. As described herein, the tree stand 100 is formed of a number of components/assemblies that interconnect with one another to form the assembled tree stand 100. As shown, the tree stand 100 has a selected height and in particular, the height of the tree stand 100 is selected in view of the desired height that the person who is supported by the tree stand wishes to be elevated at relative to the ground surface on which the tree stand 100 lies.

FIGS. 2A-15 illustrate the various individual parts/assemblies that form the tree stand 100 and each are described below in detail.

Turning first to FIGS. 2A-6D which show components (parts) that form a frame assembly 110 of the tree stand 100.

FIGS. 2A-2E show the frame assembly 110 in its assembled form. As shown, the frame assembly 110 defines the height of the tree stand 100 and also is the part that rests against the ground surface and includes a leveling feature as described below. The frame assembly 110 includes a base platform 120, a first upright frame (right side) 130, a second upright frame (left side) 140, an upright back wall 150, a top cross member 160, a plurality of hinges 170, one or more strapping points 180 and a cart handle 190.

FIGS. 3A-3D illustrate one exemplary base platform 120. It will be appreciated that the base platform 120 can take any number of different shapes and sizes and the illustrated base platform 120 is generally square shaped. The base platform 120 is formed of a base station 122 that is formed of a number of structural supports, such as rear and forward transverse supports and a pair of side supports extending therebetween and a center support between the rear and forward transverse supports. Along the rear transverse support a pair of wheels 123 are rotatably mounted. For example and as shown, the rear transverse support can include downwardly extending legs 124 to which the wheels 123 are rotatably mounted. The wheel 123 includes an axial and a bearing can be provided within the leg 124. The forward transverse support can also include downwardly extending legs 125 from which leveling feet 126 adjustably extend. Each leg 125 includes one leveling foot 126 which moves in an axially direction and can be locked in any number of different vertical positions. For example, the leveling foot 126 can be a screw based foot that is rotated to change the length of the leveling foot 126 that extends below the leg 125. In addition, each leg 124 also includes one leveling foot 126.

The base platform 120 also includes a foldable extension 127 which is foldable relative to the base station 122. For example, the foldable extension 127 can be coupled to the base station 122 by a hinge 128 that allows the foldable extension 127 to fold. The foldable extension 127 can thus be positioned between a folded position (storage position) in which the foldable extension 127 is folded along hinge 128 and lies on top of the base station 122 and an extended (in-use) position in which the foldable extension 127 lies adjacent the base station 122 as shown in FIGS. 3A-3D. In the extended position, it will be appreciated that the foldable extension 127 increases the footprint of the base platform 120. Similar to the base station 122, the foldable extension 127 includes a number of structural supports, such as rear and forward transverse supports and a pair of side supports extending therebetween and a center support between the rear and forward transverse supports.

Each of the forward and rear transverse supports can include downwardly extending legs 129. Each leg 129 includes one leveling foot 126 which moves in an axially direction and can be locked in any number of different vertical positions.

FIGS. 2A-2C illustrate the first upright frame (right side) 130 and the second upright frame (left side) 140 which can be a mirror image one another and therefore, at least in one embodiment, have the same construction. Each of the first and second upright frames 130, 140 include first and second angled vertical supports (rails) 132, 134 that converge in a direction toward an upper end thereof. As shown, the first rail 132 can be a linear rail and the second rail 134 can be formed at an angle thereto. Between the first and second angled vertical supports 132, 134, a plurality of cross-supports 135 are provided and are coupled to their ends to the two supports 132, 134. One of the cross-supports 135 is a bottom cross support extends between and is coupled to the first and second angled vertical supports 132, 134 at bottom ends thereof and similarly, one of the cross-supports 135 is a top cross support extends between and is coupled to the first and second angled vertical supports 132, 134 at top ends thereof. Each of the first and second upright frames 130, 140 is widest at the bottom end.

As shown in the figures, each of the first and second upright frames 130, 140 is securely attached to the base platform 120 and in particular, is securely attached to the base station 122. The bottom cross-support 135 is attached along one side support of the base station 122 using conventional means, such as using fasteners, etc. For example, a bracket can be used to the mount the first and second upright frames 130, 140 to the respective side supports.

It will be appreciated that the first and second upright frames 130, 140 can be formed of a plurality of interconnected sections to allow a breakdown of the assembly for a more compact storage. For example, the interconnected sections can be connected to one another using conventional means, such as the use of fasteners, brackets, and/or male/female coupling structures.

The upright back wall 150 extends between the first and second upright frames 130, 140 and provide a rear support structure. FIGS. 4A-4D illustrate the upright back wall 150. The upright back wall 150 is an elongated structure and the width of the upright back wall 150 is sized relative to the forward transverse support of the foldable extension 127. The upright back wall 150 is formed a plurality of plates 151 which are preferably, heavy duty foldable plates. As shown in the front views of FIGS. 4A and 4B, the front surface (face) of the upright back wall 150 includes a pair of spaced gliding rails 152 that protrude outwardly from the plates 151. The gliding rails 152 are spaced apart from one another and are parallel to one another. The gliding rails 152 are thus raised tracks that function as described below. As shown in the figures, each gliding rail 152 can include side notches 153. Between the gliding rails 152, there is a center track 155. The center track 155 is defined by a flat, planar surface. The center track 155 can be slightly raised relative to adjacent portions of the back wall 150.

In addition, along the upright back wall 150 there are a plurality of locking pin locations 157 (see FIG. 2B). The locking pin locations 157 are formed along a length of the upright back wall 150 at spaced distances. As shown, the locking pin locations 157 can be formed along the center track 155. While a pair of locking pin locations 157 are shown in FIG. 2B, there can be more than two locations 157.

It will be understood that, at least in one embodiment, the upright back wall 150 can be formed of a number of different sections that are interconnected with one another to form the assembled structure shown in the figures. The sections can be interconnected with one another using conventional means including mechanical attachment, such as use of brackets, hinges, fasteners, etc. In one embodiment, the upright back wall 150 is formed of foldable sections.

FIGS. 5A-5E illustrate the top cross member 160 which can be in the form of a top cross plate. The top cross member 160 is configured to secure the frame assembly. The illustrated top cross member 160 is in the form of a plate 162 which in this case has a rectangular shape and has a top surface and an opposing bottom surface. The shape and size of the top cross member 160 are selected in view of the shapes and sizes of the other frame components. Along the bottom surface there is a plurality of hollow posts 164 that extend outwardly therefrom. The hollow posts 164 can be formed at a right angle to the bottom surface. As shown, the two hollow posts 164 are spaced apart with one formed proximate one end of the plate 162 and the other formed proximate the other end of the plate 162. Along the top surface of the plate 162, the hollow posts 164 are freely open to allow insertion of an umbrella shaft therein to hold the umbrella upright above the user. The posts 164 can thus be thought of as being cup like structures that receive the umbrella shafts. Between the posts 164, along the bottom surface, is a harness latching point 165 defined by a looped structure (e.g., U-shaped structure in which both legs are attached to the bottom surface). The harness latching point 165 is configured such that its opening is formed perpendicular to a longitudinal axis of the plate 162.

FIGS. 6A-6D illustrate one foldable hinge 170. The foldable hinge 170 is defined by a first plate 172 and a second plate 174. The two plates 172, 174 partially overlap a rivet 175 passes through both plates 172, 174 to join the plates 172, 174 and allow them to swivel (pivot) relative to one another. Each plate 172, 174 can include one or more mounting holes 176. As shown, the holes 176 can be axially aligned with the rivet 175.

The frame assembly also includes strapping points 180 which are shown in FIGS. 2C and 2D. The strapping points 180 can be arranged in pairs at locations spaced along height of the back wall. For example, the strapping points 180 can be formed along proximate the side edges of the back wall. The strapping points 180 can be in the form of hooks or the like. For example, U-shaped hooks or D-shaped hooks can be used. These hooks (strapping points) 180 extend outwardly from the rear of the back wall. The locations of the sets of strapping points 180 can vary along the height of the back wall.

The frame assembly also includes the cart handle 190 and more particularly, can include a pair of cart handles 190. The cart handle(s) 190 are mounted along the rear of the back wall.

Any number of different types of cart handles 190 can be used. For example, the illustrated cart handles 190 are generally L-shaped, with the short leg pointing downward to be grasped by the user's hand. The cart handles 190 allow the user to move and transport the assembly as described herein.

FIGS. 7A-7D illustrate a seat assembly 200 that is operably coupled to the other components of the tree stand 100. Similar to the frame assembly, the seat assembly 200 is formed of a number of components. For example, the illustrated seat assembly 200 includes a back support 210, a seat base 220, a seat base and leg platform support 230, a leg platform 240, a controller arm 250, a seat foundation 260, and a plate attachment 270 (FIGS. 10A and 10B).

The back support 210 can be in the form of an upright/upstanding structure and in the illustrated embodiment, is defined by a curved transverse member (rail) 212 and a pair of upstanding posts 214. The pair of pots 214 is located at the two ends of the curved transverse member 212 and thus are spaced apart from one another.

The seat base 220 is a frame formed of a number of support members. The seat base 220 can be formed of a front frame member 221, an opposing rear frame member 222, and a pair of side frame members 223 that connect the front and rear frame members 221, 222. The rear frame member 222 can have a curved shape complementary to the curved shape of the rail 212. An opening is formed between the frame members 221, 222, 223.

As shown in FIG. 8A, the seat base 220 includes a seatbelt 224 that is secured along one side frame member 223. A complementary seatbelt lock 225 is disposed along the opposite side frame member 223 opposite the seatbelt 224. Along the rear frame member 222, a limit switch 226 is provided.

The seat assembly 200 also includes a seat base and leg platform support 230. The seat base and leg platform support 230 includes a pair of vertical supports 232 that are spaced apart and are parallel to one another. The pair of vertical supports 232 is attached to the seat base 220 using conventional techniques, including but not limited to the use of brackets and/or fasteners, etc. Bottom ends of the vertical supports 232 are attached to the leg platform 240. As shown, the leg platform 240 can be in the form of a plate on which the user's feet rest during use. The leg platform 240 can come in any number of different shapes and sizes. In the illustrated embodiment, the leg platform 240 has a tapered construction in that it tapers outwardly in a direction away from the seat base 220. The leg platform 240 can be a perforated structure in that it includes a series of openings formed therein. The platform 240 is formed at a right angle relative to vertical supports 232.

The seat assembly also includes the controller arm 250 which is disposed above the seat base 220 along one side thereof. The controller arm 250 includes a vertical support 252 that attaches the controller arm 250 to the base section 220 and more particularly to one side frame member 223. The controller arm 250 extends forwardly along the side support of the seat base 220. The controller arm 250 also includes an arm rest 252 that is also shown in FIGS. 9A-9D. The arm rest 252 is an elongated structure that has a top surface on which the user's arm can rest. The arm rest 252 can include padding on which the user's arm rests. At one end of the arm rest 252, the arm rest 252 can include a digital touch screen 253. The digital touch screen 253 can be a pivotable structure and can pivot between an open position and a closed position. The arm rest 252 lies parallel to the base section 220.

The controller arm 250 also includes a number of user controls and in particular, the controller arm 250 can include a joystick 255 that extends upwardly from the controller arm 250. Manipulation of the joystick 255 allows for control over the seat assembly and as described herein, when the user moves the joystick in one direction, the seat assembly will move in a corresponding direction. If the user moves the joystick in another direction, the seat assembly will move in a different corresponding direction. The controller arm 250 also includes one or more buttons 256 that also are part of the operating system and when depressed, causes the seat assembly to undergo a corresponding action.

The controller arm 250 optionally includes a foldable cup holder 257. The foldable cup holder 257 is disposed along an outer side edge of the arm rest 252. The foldable cup holder 257 can be in the form of a flat plate with a center opening formed therein to receive and hold a cup. FIG. 8B shows the foldable cup holder 257 in the in-use extended position. The controller arm 250 also includes a foldable gun rest/rack 258 that is coupled to but spaced from the arm rest 252. As shown, the foldable gun rest/rack 245 is coupled to the arm rest 252 (e.g., as by being coupled to an underside thereof) and extends outwardly from the arm rest 252. The illustrated foldable gun rest/rack 258 is connected to the arm rest 252 by an arm that is disposed generally perpendicular to the side of the arm rest 252 and a vertical support member (post) extend upwardly from the perpendicular arm and includes a gun receiving upper end 259 (e.g., a U-shaped structure defining an opening between the parallel legs for receiving and orienting a gun and allow it to rest therein). In one embodiment, the gun rest/rack 258 is laterally movable within an integral to allow the user to position it in a desired position and a locking feature can be provided to lock the gun rest/rack 258 in a desired position.

One exemplary seat foundation 260 is shown in FIG. 10A. The seat foundation 260 is configured to store a number of the operating parts of the motorized assembly. For example, the seat foundation 260 is coupled to an underside of the seat assembly. The seat foundation 260 thus is in the form of a housing. The seat foundation 260 includes a battery housing 262 that receives and contains a battery 263. The seat foundation 260 is user accessible and therefore, the battery 263 is accessible and can be removed and replaced. The seat foundation 260 also includes a motor housing 264 and more specifically, a second motor 265 is contained within the motor housing 264. As described herein, the second motor 265 is operable to cause a desired motion in the seat assembly. The seat foundation 260 also includes a bearing/swivel plate 266 that is shown in FIG. 7B. The bearing/swivel plate 266 is disposed between the motor housing 264 and the seat base. As shown, the bearing/swivel plate 266 can be a curved structure. The bearing swivel plate 266 is formed of a two layer plate construction with a bottom plate thereof being fixedly attached to the motor housing 264 and a top plate thereof being fixedly attached to the seat base 220 with bearings being provided to allow the top plate to swivel relative to the bottom plate. As described herein, the second motor 265 controls the pivoting (swinging motion) of the seat assembly. The second motor 265 is thus operatively connected to the top plate of the bearing swivel plate 266 as by a coupling between a drive shaft and the top plate such that operation of the motor results in rotation of the drive shaft. Rotation of the drive shaft results in rotation (pivoting) of the top plate relative to the bottom plate of the bearing swivel plate 266 resulting in a pivoting of the seat base 220 and the seat assembly itself. Rotation of the motor's drive shaft in one direction results in pivoting of the seat in a first direction and rotation of the motor's drive shaft in the opposite direction results in pivoting of the seat in a second direction, thereby allowing left/right movement of the seat.

The plate attachment 270 is shown in FIGS. 10A and 10B. The plate attachment 270 is disposed between the back wall and the seat foundation 260. The plate attachment 270 includes a mounting plate 272 which is coupled to the seat assembly. Attached to the plate attachment 270 is a first motor 273 and a driven wheel 274 which is operatively coupled to the first motor 273. As described herein, the first motor 273 controls the up/down motion of the seat assembly. The plate attachment 270 also includes a pair of gliding brackets 276 that are spaced apart from one another and are parallel to one another. The first motor 273 is disposed between the gliding brackets 276. Gliding rail brackets 276 are provided for mounting the seat assembly to the rear wall 150 and more specifically, as shown, the gliding rail brackets 276 are female parts that mate with and engage the gliding rails 152 which comprise male parts. The mating between the gliding brackets 276 and the gliding rails 152 provides stability to the seat assembly as it is driven and also acts as an attachment point between the rear wall 150 and the seat assembly and also acts as a guide track to ensure vertical movement of the seat assembly.

FIGS. 11A-11D illustrate an exemplary folded cart 300. The folded cart 300 is formed of components previously described and in particular is formed of sub-sections of the frame assembly 110. More specifically, the cart 300 includes the base platform 120 and a lower section of the right and left upright frames 130, 140 along with the foldable extension 127. The wheel 123 of the base platform 120 permit the cart 300 to travel over ground and the handles 190 permit the user to grasp the cart 300 and push or pull it once the cart 300 is tilted to elevate the front off of the ground surface. Between the rear wall 150, side frames 130, 140 and the foldable extension 127 in its upright position, a hollow space is formed to receive and transport objects, such as other parts of the tree stand 100. This allows the tree stand 100 to be transported along the ground surface until the chosen tree (to which the tree stand 100 is mounted) is located.

It will be appreciated that there are at least two (2) different types of the cage/platform assemblies, namely, one that is made from metal round tubing that is threaded (male/female) to fit into each other for assembly or disassembly to tear down and the other is made of square tubing bent or welded to the shape shown in FIG. 2A-2E. The individual frame pieces are assembled with custom hinges (See FIGS. 6A-6D) that allow the platform to be foldable. One plate 172 of the hinge 170 is attached to one frame piece and the other plate 174 of the hinge 170 is attached to the other frame piece.

Assembly of the System (Tree Stand) 100

The tree stand 100 can be assembled a following process that includes the following steps.

The base platform 120 (FIGS. 3A-3D) is the foundation of the system 100 and contains the levelling feet 126 to adjust levelling on the ground, front extension 127 (which is folded while the system is disassembled or stored) and the tires 123 for easy roll around.

Once the base platform 120 is set at a desired location adjacent a tree, the right and left frames 130, 140 are installed and fastened to the base platform 120 (i.e., the base station 122 thereof) using fasteners, such as bolts, through the designated welded plates. The complete frame assembly 110 is secured at the top with the top cross member 160.

As described herein the right and left upright frames are formed of a plurality of separate sections that are assembled and coupled to another to form the complete structure. For example, each side can consist of five (5) sections that form the triangular shape of the side frames 130, 140. The five (5) members can be attached with hinges 170 which allow the section to fold and unfold. Each of the sections are also secured with a quick release pins to prevent the members from folding during the operation of the system 100. The quick release pins are preferably located at the center base of each section. Alternatively, as mentioned previously, the frame parts that form the sides 130, 140 can be coupled by male/female coupling elements and fasteners instead of using hinges 170.

Once the two side frames 130, 140 are fully assembled, the top cross member 160 is installed to secure the top and adds stability to the upright frames 130, 140. This member has two cups (hollow posts) 164 to install an umbrella as an option.

The back (rear) wall 150 is ready to be installed. The back wall 250 also preferably is formed of a plurality of sections that are joined to one another to form the assembled back wall 250. For example, the back wall 250 can consist of five (5) sections and each section contains the gliding rails 152, which allow the gliding up and down smoothly, and the drive track 155, which is topped with treaded rubber to create friction for the driven wheel 274 to go up and down. The back wall sections are fastened with fasteners, e.g., bolts, into the upright frames 130, 140.

Now that the frame 110 is fully assembled, it's time to install the seat assembly 200 (FIGS. 7A-7D). As previously mentioned, the seat assembly 200 consists of the seat back support 210, the seat base 220 where the user sits down, the leg platform 240 that allows the user to stand and use it for leg rest. The seat base 220 and the leg platform 240 are attached with seat base and leg platform support 230. The seat base 220 is affixed on the seat mounting base (foundation) 260 which consists of: the battery housing 262, the second motor housing 264 and the seat 220 is attached the base assembly 260 with swivel plate 266 (FIG. 7B). Note: The battery housing 262 is where the source of power (battery 263) is stored and the second motor housing 264 is where second motor 265 is installed. This second motor controls the swing of the seat 220 from one side to another.

There are two (2) different styles of the arm rest, namely, an analog type and a digital type. The analog type is shown in FIGS. 8A-8C and this type controls the system 100 using buttons, to power the system ON/OFF, and 4-way joystick 255 which enables the user to go up/down and from one side to another. It also has the foldable cup holder 257 and the foldable gun rest (rack) 258. The digital type is shown in FIGS. 9A-9d and is the same as the analog type, except it controls the system using a foldable and programmed touch screen display 253. The user controls the system 100 with a touch of virtual button and menus that appear on the screen. In this embodiment, which is a computer implemented version, computer hardware is provided, such as a processor, memory, etc., that allow the software program to be executed.

Figure 15:
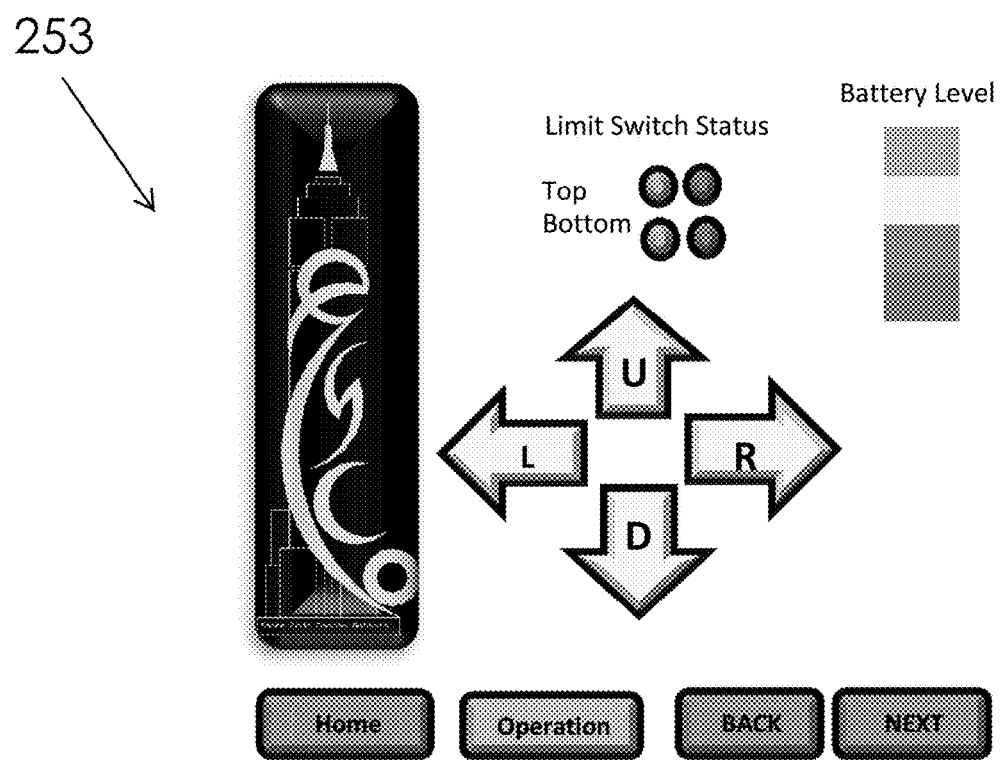
FIG. 15 is a graphic representative of a graphical user interface on a touch screen display.

FIG. 15 shows a touch screen display 253 that includes an exemplary graphical user interface. As shown, user inputs can be in the form of a plurality of arrows that reflect and can be labeled as up, down, left and right. In addition a battery status indicator can be provided to show the strength of the battery. In addition, as mentioned herein, the status of the limit switch can be indicated. In addition, other selectable buttons and menus can be provided. It will be appreciated that the software program of the present invention transforms the inputs received on the graphical user interface into control commands that are delivered to the various components to control operation thereof.

Now the seat assembly is complete, it's the time to attach the seat assembly 200 to the system frame 110. The mounting plate 272 (FIG. 10B) is attached to the battery housing 262. The first motor 273 is installed on the mounting plate 272 along with the drive wheel 274. The drive wheel 274 is thus operatively connected to the first motor 273 as by a drive shaft such that operation of the motor 273 results in rotation of the drive shaft and the drive wheel 274 in both a first direction (to move the seat assembly in an upward direction) and an opposite second direction (to move the seat assembly in a downward direction). The drive wheel 274 is in intimate contact with the center track 155 such that it is driven therealong.

After installing the first motor 273 and the drive wheel 274, this assembly gets attached to the gliding brackets 276 (FIG. 10A). The gliding brackets 276 then engage the gliding rails 152 as described herein.

Once all of the components are attached, the entire assembled tree stand 100 can be secured to a strong tree using ratcheted straps. There is a plurality of strapping points 180 on each side of the upright frame. This prevents the system 100 from leaning down or sliding to any direction.

Operation of the System (Tree Stand) 100

Now the system 100 is assembled, installed and secured, the source of power (battery 263) is installed and a power cable is attached. The power cable is connected to a control board (which can be incorporated into the arm rest) at one end and connected to the battery 263 at the other end.

Safety Instruction must be followed at all times.
Turn the Power ON.
Analog Type:
  Push the joystick forward to move up.
  Push down to move down.
  Push to the right to move to the Right Side.
  Push to the left to move to the Left.
Digital Type:
  Press "U" to move UP.
  Press "D" to move DOWN.
  Press "R" Arrow to move to the RIGHT.
  Press "L" to move to the LEFT.
Once the Seat is at the maximum allowed height, depending on the model, there is a limit switch 226 (FIG. 8A) mounted at the back of the seat to prevent the seat from over travelling. In the digital option, there is a light indicator to reflect the status of the limit switch 226 when engaged.
Once the seat is at the top, the operator inserts a quick release pin to the reinforced hole 157 (FIG. 2B) at the top of the back wall 150 to prevent the seat from dropping in case of malfunction or misuse. This is used as a secondary safety device.
The operator will secure his/her own safety by hooking his/her safety harness to the top latch point 165 as shown in (FIG. 5C).

FIGS. 12A-12D illustrate an alternative cage structure 400. The cage structure 400 is made of threaded metal tubing members that can be fastened (screwed) together for assembly and unscrewed for disassembly.

The cage structure 400 comprises a frame 410, a pair of side support members 420, a top plate 430 and a bottom plate 440.

The side support members 420 add to the strength of the structure 400 and also can be used as ladder in case of accidental fall to climb up or down. The seat assembly 200 is still the same as is the rest of the components shown in FIGS. 1A and 1B including the rear wall 150.

FIGS. 13A-14C illustrate a rotating and swinging tree stand 500 that is intended to act as a standalone unit. The tree stand 500 is not coupled to a frame assembly and therefore, lacks the motorized vertical movement described with reference to the tree stand 100. The tree stand 500 is intended to be mounted directly to the tree and uses an alternative seat assembly 510 that does provide a motorized swivel (left/right) movement. The seat assembly 510 can thus be used independently by itself as a rotating and swinging hunting tree stand. It provides the option of changing position while the hunter remains seated, utilizing the previously mentioned control processes.

The seat assembly 510 includes a seat to tree support bracket 520, a strapping member 530, and strapping points 540. The strapping member 530 seats directly against the tree and straps (mounting equipment) are received through the points (holes) 540 to attach the stand 500 to the tree. As shown, the strapping member 530 can be pivotally coupled to the bracket 520 (as by a vertical shaft) to allow pivoting of the strapping member 530 to accommodate different sized (different widths) trees. Both strapping members 530 can thus be pivoted to accommodate the trunk of the tree. The strapping members 530 are thus pivoted until they are in a position in which they securely seat against the tree trunk.

The stand 500 includes the seat foundation 260 including the second motor 265 which is operatively connected to the swivel plate 266 to cause controlled movement of the seat base 220 and thus the seat assembly 200 as described above.

The present invention is designed to offer the operator functions that are not available in commercially available tree stand systems. It provides the operator with many options such as elevating up or down, rotating and swinging from one side to another with a push of a button or a joystick. It also enables folks with limited ability to climb up or down a tree stand and enjoy hunting or bird watching.

This system provides the operator the ability to swing and rotate from one side to another. As explained earlier, it gives the operator the chance of changing position without compromising their own safety. Just with a push of a button they can select to change the position/direction to have better visibility and clearance to their target while seated.

It also offers additional safety aspects, such as using the sides as a ladder to free themselves from being stranded in the middle of the forest suspended by their harness, were it may cuts the blood supply to various parts of the body. The use of the seatbelt 224 while moving, prevents the operator from falling accidently. The harness latching point 165 is built in, so they don't have to climb a ladder and reach the top to place a strap on the tree, and then latch their harness to it. These can be a major safety issues which are overcome by using the present system.

It will be understood that the various components described herein can be formed of any number of suitable materials, including rigid plastics and metals and even wood and the seat can include cushioning, etc.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A motorized tree stand comprising:
   a frame assembly for attachment to a tree;
   a seat assembly operatively coupled to the frame assembly and providing a seat on which a user can sit;
   a first drive assembly coupled to the seat assembly and configured to controllably move the seat assembly in a vertical direction along the frame assembly such that a location of coupling between the seat assembly and the frame assembly changes as the seat assembly moves in the vertical direction along the frame assembly;
   a second drive assembly coupled to the seat assembly and including a motor that is configured to controllably swivel the seat assembly relative to the frame assembly, wherein the second drive assembly is carried by the seat assembly and moves in unison therewith when the seat assembly moves in the vertical direction;
   a controller operatively connected to the first and second drive assemblies; and
   a power source connected to the first and second drive assemblies and the controller.

2. The motorized tree stand of claim 1, wherein the frame assembly comprises an assembly of individual frame sections that can be detachably connected to one another to form the assembled frame assembly.

3. The motorized tree stand of claim 1, frame assembly comprises a rear wall for securing to the tree, and a pair of side frames between which the seat assembly is disposed at least in a bottom position of the seat assembly.

4. The motorized tree stand of claim 3, wherein the rear wall includes a vertical track on which a driven wheel of the first drive assembly is driven to cause vertical movement of the seat assembly, the first drive assembly including a motor that is operatively coupled to the driven wheel such that operation of the motor of the first drive assembly causes rotation of the driven wheel resulting in the driven wheel moving vertically along the vertical track.

5. The motorized tree stand of claim 1, wherein the rear wall includes at least one vertical gliding rail which mates with a complementary bracket that is part of the seat assembly to guide the seat assembly as the seat assembly travels vertically along the gliding rail.

6. The motorized tree stand of claim 1, wherein the frame assembly includes a foldable bottom portion that includes a base platform with wheels and adjustable leveling feet protruding downwardly from the base platform.

7. The motorized tree stand of claim 1, wherein the frame assembly includes left and right frames and a top cross member that is secured to and extends across upper ends of the left and right frames, the top cross member including at least one hollow receiving tube for receiving an umbrella shaft and a harness latching point that extends downwardly from an underside of the top cross member.

8. The motorized tree stand of 1, wherein the controller comprises a digital controller that includes an arm rest attached to the seat assembly, the arm rest including a touch screen display to control movement of the seat assembly in both a vertical direction and in a left to right direction which comprises the swivel motion of the seat assembly.

9. The motorized tree stand of claim 1, wherein the frame assembly includes angled side frames coupled to a rear wall along which the seat assembly is driven, the angled side frames being wider at a bottom end thereof, the seat assembly being configured such that the seat assembly can only swivel once it assumes an upper position as opposed to a lower position at which the angled side frames prevent the seat assembly from swiveling.

10. The motorized tree stand of claim 1, wherein the rear wall includes spaced holes for receiving locking pins.

11. A motorized tree stand comprising:
a frame assembly for attachment to a tree;
a seat assembly operatively coupled to the frame assembly and providing a seat on which a user can sit;
a first drive assembly coupled to the seat assembly and configured to controllably move the seat assembly in a vertical direction along the frame assembly, the first assembly including a first motor;
a second drive assembly coupled to the seat assembly and including a second motor that is configured to controllably swivel the seat assembly relative to the frame assembly;
a controller operatively connected to the first and second drive assemblies; and
a power source connected to the first and second drive assemblies and the controller;
wherein the seat assembly includes a seat base and a seat foundation and a plate attachment for coupling the seat assembly to the frame assembly and permit vertical movement of the seat assembly along the frame assembly,
wherein the second drive assembly, including the second motor thereof, and the power source are disposed within the seat foundation and the first drive assembly, including the first motor thereof, is configured to drive the seat assembly vertically along the frame assembly and is disposed within the plate attachment.

12. The motorized tree stand of claim 11, wherein the seat foundation includes a housing that includes a first portion for containing a battery which comprises the power source and a second portion for containing the second motor that is part of the second drive assembly, the second motor being operatively coupled to seat base for controllably swiveling the seat base.

13. The motorized tree stand of claim 12, wherein the seat foundation further includes a bearing swivel plate formed of a first bottom plate that is fixedly attached to the housing of the seat foundation and a second top plate that is fixedly attached to the seat base, the first bottom plate and the second top plate being pivotally coupled to one another, the second motor being operatively coupled only to the second top plate such that operation of the second motor causes swiveling of the seat base.

14. The motorized tree stand of claim 11, further including a leg platform secured to the seat base and extending radially outward therefrom.

15. The motorized tree stand of claim 1, wherein the controller comprises an analog controller that includes an arm rest attached to the seat assembly, the arm rest including a joystick to control movement of the seat assembly in both a vertical direction and in a left to right direction which comprises the swivel motion of the seat assembly and at least one button that controls operation of the tree stand between an on position and an off position.

16. The motorized tree stand of claim 15, further including a foldable cup holder that is part of the arm rest and extends outwardly therefrom and a foldable gun rest and extends upwardly from the arm rest and has a top portion defined by two spaced arms connected by a bottom wall for receiving a gun.

17. A motorized tree stand comprising:
a frame assembly for attachment to a tree;
a seat assembly operatively coupled to the frame assembly and providing a seat on which a user can sit;
a first drive assembly coupled to the seat assembly and configured to controllably move the seat assembly in a vertical direction along the frame assembly;
a second drive assembly coupled to the seat assembly and configured to controllably swivel the seat assembly relative to the frame assembly;
a controller operatively connected to the first and second drive assemblies; and
a power source connected to the first and second drive assemblies and the controller;
wherein the frame assembly includes a bottom part that is a cart that includes wheels and adjustable leveling feet and a cart handle, the cart including side frame members and a rear wall bottom portion, the frame assembly further including at least one section that mates with the cart to form a continuous frame assembly, the at least one section including another rear wall portion that abuts the rear wall bottom portion and side frame members that abut the side frame members of the cart, a bottom of the cart being a base station and including a foldable extension which in a folded up position defines a front wall of the cart, the foldable extension including adjustable leveling feet.

18. A motorized tree stand comprising:
a seat assembly providing a seat on which a user can sit, a tree support bracket extending rearwardly from the seat, and a pair of opposing strapping members that are pivotally attached to a rear of the tree support bracket along parallel vertical axes, each strapping member including a plurality of strapping points for receiving a strap to be secured around the tree;
a drive assembly including a motor that is directly coupled to a swivel plate that is part of the seat assembly and the swivel plate is also coupled to a seat foundation housing which houses at least a portion of the drive assembly, the motor being disposed below the swivel plate and is configured to controllably move the swivel plate resulting in swiveling of the seat assembly relative to the seat foundation;

a controller operatively connected to the drive assembly; and a power source connected to the drive assembly and the controller.

19. The motorized tree stand of claim 18, wherein the motor is disposed within a housing and includes a rotatable drive shaft that is coupled to the swivel plate to cause pivoting of the swivel plate, the swivel plate including a first plate fixedly attached to a frame of the seat and a second plate fixedly attached to the housing, the first plate pivoting relative to the second plate.

* * * * *